2,844,611

MANUFACTURE OF ACYLAMINO CARBOXYLIC ACIDS

Werner Freudenberg, Camp Hill, Pa., assignor to General Aniline & Film Corporation, New York, N. Y., a corporation of Delaware No Drawing. Application July 2, 1956
Serial No. 595,140

7 Claims. (Cl. 260—404)

The present invention presents a new and useful modification of the process for acylation of compounds by the use of an acylhalide in the presence of dilute alkali; in which the reaction is conducted in the presence of a lower alkanol to reduce the amount of undesired by-product material.

The "Schotten-Baumann reaction" as a means for acylation by the reaction of an acylhalide in the presence of dilute alkali is well-known and has been found to be very useful. However, the reaction never yields the desired compound exclusively, but there are always side reactions which yield the alkali metal salt of the acylhalide, thereby wasting raw material and introducing an impurity which is highly objectionable and difficult to remove. The reactions involved may be shown graphically by the following equations.

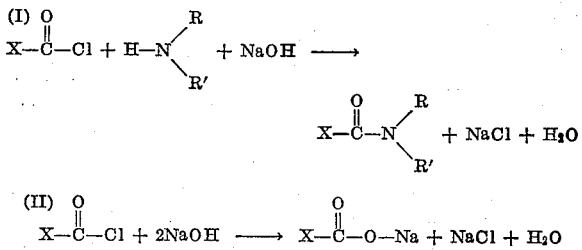

in which X represents an organic radical and R and R' represent aliphatic radicals.

Reaction I shows formation of an N-acylamino compound as the main product, Reaction II shows the formation of the undesired by-product, the alkali salt of the corresponding fatty acid.

The invention here presented is a simple, useful and wholly unexpected procedure for reducing Reaction II to a minimum and emphasizing the Reaction I for the production of the desired compound.

The improvement of the present invention lies primarily in the use of a lower alkanol in the reaction mixture, which lower alkanol shows the unexpected and surprising property of modifying very greatly, the direction of the reaction. The preferred alkanol is necessarily water-soluble and is preferably methyl, ethyl and propyl alcohol; but butyl alcohol is equally useable. The new reaction is particularly useful for the acylation of primary and secondary amines, and is preferably limited to the use, as the acylating agent, of fatty acid halides having from 8 to 22 carbon atoms in the carbon chain. The same lower alkanols are also useful in a secondary purification step, by which the unavoidable small amount of by-products may also be separated.

In practising the invention a mixture is prepared of the desired amino or imino compound, in solution in water to which there is then added an appropriate amount of alkali metal hydroxide, a suitable amount of the simple lower alkanol and then the fatty acid halide. The mixture is maintained during the entire reaction at a pH above 9.5 and the temperature is controlled by cooling to keep it below about 50° C.

The following discussion will show the character of the reaction, and the difficulties encountered in it.

This example describes a typical Schotten-Baumann reaction, the condensation of sarcosine with oleic acid chloride as practised commonly on a commercial scale.

89 parts of pure sarcosine, equivalent in the form of a 15% solution of the sodium salt are charged to the reactor, and
200 pts. of 33% caustic soda are then added, followed by 300 pts. of oleyl chloride, having a purity of 97%.
During the reaction, it is necessary to insure that the mixture continues to show a pH above 9.5. When the addition is completed, stirring is continued for a half hour at 50°. The mixture is then neutralized with about 40 pts. 20° Bé. hydrochloric acid.

Sodium oleyl sarcosinate is formed in a yield of about 70% of theory and contaminated by sodium oleate, sodium chloride, unreacted sarcosine and minor amounts of other by-products, which are difficult to separate and represent a serious loss of valuable material.

Many factors influence the course of this reaction such as concentration of the reactants, temperature, type and rate of agitation and maintenance of a definite pH range. The nature of the hydrogen halide acceptor also effects the course and rate of reaction.

The reaction is most commonly carried out by adding the acyl halide slowly to the alkaline solution of the base.

The order of addition has in rare cases been reversed and the alkali added to the mixture of the base and the acyl halide. Obviously this is possible only when the acyl halide does not react at an appreciable rate with the base and especially with the aqueous medium. For practical purposes it may be noted, that the base is in solution or in suspension in an aqueous phase as the alkali salt, and the fatty acyl halide is added over a period of time. Additional hydrogen halide acceptor is added as the reaction between fatty acid halide and the amino or imino group progresses. Incomplete condensation is known to occur when the amino group in itself acts as hydrogen acceptor, with formation of amine hydro halide, thus blocking continued condensation. Complete reaction is indicated when no further quantities of hydrogen halide are formed or when the pH of the condensation mass remains constant.

Thus a serious disadvantage of the Schotten-Baumann reaction is the fact that quantitative yields of N-acylamino compounds are never obtained. Formation of the alkali salts of the acid derived from the acyl halide by hydrolysis is always observed. Thus, when employing the halides of fatty acids, sodium salts of fatty acids are obtained as side products. A further source of occurrence of fatty acid salts or soaps in the condensation product is due to the fact that technical grades of fatty acid chloride invariably contain varying amounts of fatty acid per se which result from incomplete conversion of the free fatty acid to the acid halide. It is furthermore known that even distilled fatty acid halides retain free fatty acid due to entrainment and hydrolysis during distillation.

The fatty acylamino compounds produced by my invention are widely used as detergents, wetting, fulling, foaming and leveling agents in the textile, rubber and paper industries. The cosmetic industry also depends on these compounds, for instance as anti-enzymatic additives to dentifrices and as emulsifiers for lotions and creams.

Contamination of these products with salts of fatty acids constitutes a serious economic disadvantage for the producer of these chemicals, since the yield of desired condensation product decreases proportionally with every mole fraction of soap formed as a by-product. Admixed soaps also greatly alter the properties of the finished goods. This is especially true when the fatty acylamino compounds are to be prepared in pure form for the cosmetic and food industry. As has been pointed out, fatty acyl amino carboxylic acids should contain a minimum of free fatty acid or soap for maximum activity and lasting effect and in order to avoid the characteristic biting taste and unpleasant odor of soaps which can not satisfactorily be masked by flavoring agents. Although it is well known that fatty acids and soaps can be eliminated by crystallization from organic solvents, this method is expensive, time consuming, wasteful, and often objectionable due to the hazards involved in handling flammable solvents on a large scale.

Thus the process of the invention is an improved method of acylating compounds in improved yield by the addition to the reaction of substantial quantities of a lower alcohol. Other objects and details of the invention will be apparent from the following description.

The following examples show that the addition of alcohol to the mixture to be acylated depresses the rate of Reaction II to such an extent that the finished product contains from ¼ to ⅕ of the undesired fatty acid salt unavoidably present when the material is prepared by the original Schotten-Baumann reaction.

The alcohol addition may be made in several ways. The alcohol may be added to the mixture of the base and alkali and then the acyl halide added, or the condensation may be started in the conventional way and then the alcohol added to the reaction at a point when part of the fatty acid chloride has been added.

It has not been possible to firmly establish the fate of the alcohol in the reaction. It is believed that esterification or alcoholysis takes place to some extent. However, the rate of alcoholysis is infinitely slower than the reaction of the amino alkyl sulfonate or amino alkyl carboxylate with the fatty acid halide.

The following examples illustrate my invention but do not limit the scope of the claims.

*Example 1*

4500 lbs. of a 13% aqueous solution of sarcosine =565 lbs. 10% or 6.35 moles is charged into a kettle constructed of stainless steel.

4100 lbs. of water is then added to lower the sarcosine concentration to 6.5%. There is then added at 25–35° C., in the course of 6 hours, 1430 lbs. lauric acid chloride. Brine cooling is required to control the reaction.

While the addition of the acid chloride proceeds, 650 lbs. of 50% sodium hydroxide solution is added in three equal portions at the end of the first, second and third hour. The solution must at all times during the condensation remain at a pH above 9.5. When the addition was complete the mixture was allowed to stir for an additional hour. A sample was then taken which was analyzed for free lauric acid and for lauroyl sarcosine.

For the following table, item B was conducted without the presence of the lower alkanol; item A was conducted in the presence of 734 lbs. of specially denatured alcohol added with the diluting water.

The following (actual) figures were obtained with (A) and without (B) addition of alcohol.

| A. With Alcohol | | | B. Without Alcohol | | |
| --- | --- | --- | --- | --- | --- |
| Batch No. | Percent Lauric Acid | Percent Lauroyl Sarcosine | Batch No. | Percent Lauric Acid | Percent Lauroyl Sarcosine |
| 451 | 0.37 | 14.97 | 514 | 1.66 | 12.8 |
| 452 | 0.15 | 14.3 | 515 | 2.30 | 13.8 |
| 453 | 0.5 | 13.8 | 516 | 2.11 | 12.48 |
| 455 | 0.36 | 15.3 | 517 | 0.93 | 14.2 |
| 456 | 0.46 | 14.9 | 520 | 1.23 | 13.5 |
| 457 | 0.4 | 15.1 | 530 | 0.82 | 14.1 |
| 458 | 0.3 | 14.8 | | | |
| 459 | 0.34 | 13.6 | | | |
| 460 | .34 | 13.8 | | | |

It will be observed from this table that the presence of the alcohol resulted in the development of approximately ⅕ as much lauric acid as sodium laurate, resulting in a very substantial gain in efficiency of the reaction.

*Example 2*

A. 116 g. of a mixture of N-methyltaurine, water and sodium hydroxide was reacted with 43.2 g. tall oil acid chloride, controlling the reaction at 15–20° and with addition of sufficient sodium hydroxide to maintain the pH above 9.5. When the reaction was complete 20 g. of isopropanol was added and the product analyzed.

B. The second experiment was then performed identically but different from the first only in the fact that the isopropanol was added to the base before condensation was started. The analyses of both experiments are shown in the following table:

| | Activity, Percent | Free Fat, Percent | Residual metaurin | pH | Appearance |
| --- | --- | --- | --- | --- | --- |
| Test A | 19.6 | 3.5 | 4.9 | 9.6 | slightly hazy. |
| Test B | 24.3 | 4.3 | 2.4 | 9.5 | clear. |

As in Example 1, it will be observed that there is a very much smaller amount of by-product material produced.

*Example 3*

A pyrex reaction flask equipped with stirrer, reflux condenser, thermometer and dropping funnels was charged with 480 g. of a 13% sarcosine solution, 500 g. of water and 30 g. of propanol. There was added simultaneously in the course of 2 hours at 40–42° C. 152 g. lauroyl chloride and 65 g. of 50% sodium hydroxide solution. When the reaction was completed the condensation was a clear viscous solution, containing 0.34% sodium laurate and 14.4% sodium lauroyl sarcosinate.

To the above solution was added sufficient hydrochloric acid to lower the pH to 5.5. When this acidified mixture was cooled to 0 to 5°, the solution remained clear indicating that practically no free lauric acid is present.

When the same condensation was repeated without addition of propanol and the resulting reaction product was analyzed, 0.7% sodium laurate and 12.8% sodium lauroyl sarcosinate was formed. In addition, the final product, adjusted to pH 5.5, deposited on cooling to 0 to 5° C. a crystalline precipitate which was identified as lauric acid.

*Example 4*

To an aqueous solution of 28% strength of the potassium salt of N-methyl taurine (2 moles) was added isopropyl alcohol (2 moles) and the resulting solution reacted at 20–25° C. with tall oil acid chloride (1.9 moles) and potassium hydroxide (3 moles). When after 2½ hours the condensation was complete, a thin slurry of potassium N-acyl methyl taurate was obtained which had by analysis an active content of 26%.

When the same reaction was carried out without an organic solvent or diluent, the resulting slurry was extremely thick and had an active content of 22%.

*Example 5*

Into a solution consisting of 211 parts water, 40 parts of sodium hydroxide and 50 parts cyclohexyltaurate was charged in 1½ hours at 25–30° C. 71 parts palmitic acid chloride.

A heavy slurry (372 parts) resulted which on analysis was found to contain 67 g. palmitoyl cyclohexyltaurate.

The same experiment was repeated with the exception that 30 g. of isopropanol was added to the base before the condensation reaction was started. There was obtained 400 parts of a thin, fluid suspension of palmitoyl cyclohexyltaurate. On analysis 74 g. of this product was formed.

Thus the process of the invention adds to an acylation reaction a substantial amount of alcohol, to shift the course of the reaction to a greater proportion of acylated compound, and the same alcohol may be used to effect a subsequent purification step.

While there are above disclosed but a limited number of embodiments of the invention it is possible to provide still other embodiments without departing from the inventive concept herein disclosed. And it is therefore desired that only such limitations be imposed upon the appended claims as are stated therein or required by the prior art.

The invention claimed is:

1. In an acylation reaction wherein a carboxylic acid acyl halide is reacted with an amine in the presence of dilute alkali at a pH of approximately 9.5, the step of adding to the reaction mixture an amount of a water-soluble lower alkanol sufficient to produce a high yield of fatty acylamino compound.

2. In an acylation reaction wherein a carboxylic acid acyl halide is reacted with an amine in the presence of dilute alkali at a pH of approximately 9.5 at a temperature below about 50° C., the step of adding to the reaction mixture an amount of water-soluble lower alkanol sufficient to produce a high yield of fatty acylamino compound.

3. In an acylation reaction wherein a carboxylic acid acyl halide is reacted with an amine in the presence of dilute alkali at a pH of approximately 9.5 at a temperature below about 50° C., the step of adding to the reaction mixture an amount of water-soluble lower alkanol in aqueous solution sufficient to produce a high yield of fatty acylamino compound.

4. Process for the production of sodium oleyl sarcosinate, which comprises reacting oleyl chloride with sarcosine in alkaline solution at a pH of approximately 9.5 at a temperature below about 50° C. in the presence of ethyl alcohol in an amount sufficient to produce a high yield of sodium oleyl sarcosinate.

5. Process for producing sodium oleyl sarcosinate, which comprises reacting 89 parts by weight of sarcosine as a 15% solution in water with 200 parts by weight of 33% caustic soda solution, 300 parts by weight of oleyl chloride and 150 parts by weight of ethyl alcohol, at a temperature below about 50° C.

6. Process for the production of sodium laurate sarcosinate, which comprises reacting 565 parts of sarcosinate in 9600 parts of water, 1430 parts of lauric acid chloride, 650 parts of 50% sodium hydroxide solution and 734 parts of methyl alcohol, and maintaining the reaction temperature within the range between 25° and 35° C. for 6 hours.

7. Process for the preparation of the sodium salt of acyl methyl taurine, which comprises reacting a mixture of 116 parts by weight of N-methyl taurine, water and sodium hydroxide with 43.2 parts by weight of tall oil acid chloride, and maintaining the pH of the reaction medium above 9.5 and the reaction temperature between 15° C. and 25° C., and adding 20 parts by weight of isopropanol.

References Cited in the file of this patent

UNITED STATES PATENTS

| | | |
|---|---|---|
| 1,836,047 | Somerville | Dec. 13, 1931 |
| 2,411,434 | Katzman | Nov. 19, 1946 |